United States Patent
Meizoso Latova et al.

(10) Patent No.: US 7,668,701 B2
(45) Date of Patent: Feb. 23, 2010

(54) PROCESS FOR OPTIMIZING THE STRUCTURAL DESIGN OF A STIFFENED COMPOSITE MATERIAL PANEL

(75) Inventors: Daniel Meizoso Latova, Madrid (ES); José Antonio Rodríguez Sánchez, Madrid (ES); José Carlos Gómez López, Madrid (ES)

(73) Assignee: Airbus Espana S.L., Madrid (ES)

( * ) Notice: Subject to any disclaimer, the term of this patent is extended or adjusted under 35 U.S.C. 154(b) by 550 days.

(21) Appl. No.: 11/639,368

(22) Filed: Dec. 14, 2006

(65) Prior Publication Data
US 2008/0103740 A1      May 1, 2008

(30) Foreign Application Priority Data
Oct. 31, 2006   (WO) ................ PCT/ES2006/070166

(51) Int. Cl.
*G06F 17/50* (2006.01)
*G06F 17/10* (2006.01)
(52) U.S. Cl. .............................................. 703/1; 703/2
(58) Field of Classification Search .................... 703/1, 703/2
See application file for complete search history.

(56) References Cited

U.S. PATENT DOCUMENTS
7,010,472 B1 *   3/2006   Vasey-Glandon et al. ...... 703/6

* cited by examiner

*Primary Examiner*—Hugh Jones
(74) *Attorney, Agent, or Firm*—Ladas & Parry LLP

(57) ABSTRACT

The present invention relates to a computer-aided process for carrying out the structural design of a stiffened panel (9) made of a composite material, optimizing a target variable, comprising a first preparation phase (21) in which a Simulation Model (25) of the stiffened panel (9) with all the relevant information for the structural analysis thereof is obtained from a General Finite Element Model (23) and the modifiable variables and the restrictions (27) are defined, and a second simulation phase (51) in which the design variables are iteratively modified for the purpose of optimizing the target variable, taking into account in each iteration the load distribution changes resulting from the previous iteration, and verifying that the restrictive conditions and the safety margins associated to the pre-established failure modes are met using for that purpose simulation expert modules (55) of families of failure modes.

14 Claims, 3 Drawing Sheets

PROCESS FOR OPTIMIZING THE STRUCTURAL DESIGN OF A STIFFENED COMPOSITE MATERIAL PANEL

FIELD OF THE INVENTION

The present invention relates to process for optimizing the structural design of a stiffened composite material panel such as a skin of a torsion box of an aeronautical structure.

BACKGROUND OF THE INVENTION

The use of composite materials in the design of aeronautical structures began timidly after the Second World War. The first materials, basically glass fibers embedded in polyester resins, were used in the design of secondary structure elements, such as radomes, protection of antennae and hulls. The constant evolution of the developments of new materials has led to the progressive use thereof in more components of the airplane.

Twenty-five years of accelerated evolution, both of the properties of the material and the knowledge of their behavior, have passed since the milestone of the certification of the first primary structure element of a passenger airplane completely designed with composite material was achieved in the 80s decade until today, when the launch of the design of the greater part of the structure of an airplane in composite material is studied.

The composite materials that are most used in the aeronautical industry consist of fibers or fiber bundles embedded in a matrix of thermosetting or thermoplastic resin, in the form of a preimpregnated or "prepreg" material.

Without the intention of being thorough, the advantages of composite materials can be specified in three essential aspects:

Their high specific strength with respect to metallic materials. It is the strength/weight equation.
Their excellent behavior before fatigue loads.
The possibilities of structural optimization hidden in the anisotropy of the material and the possibility of combining fibers with different orientations, allowing the design of the elements with different mechanical properties adjusted to the different needs in terms of applied loads.

Processes for designing aeronautical structures taking advantage of said optimization possibilities are not known in the prior art and the present invention intends to solve this shortage.

SUMMARY OF THE INVENTION

The present invention provides a computer-aided process for carrying out the structural design of a stiffened panel made of a composite material, optimizing a target variable, comprising the following steps:

a) Obtaining a Simulation Model (SM) of the stiffened panel including all the relevant information for the structural analysis thereof from a General Finite Element Model (GFEM);

b) Providing the definition of at least one modifiable design variable of the stiffened panel;

c) Providing the definition of at least one restrictive condition that the design of the stiffened panel must meet;

d) Providing at least one simulation expert module of a family of failure modes of the stiffened panel;

e) Iteratively modifying the design variables of the Simulation Model (SM) of the stiffened panel for the purpose of optimizing the target variable, taking into account in each iteration the load distribution changes resulting from the previous iteration, and verifying that said at least one restrictive condition as well as the safety margin associated to the pre-established failure modes are met by using said at least one simulation expert module.

The use of simulation expert modules of families of failure modes enables the overall optimization of the structure for all the possible failure criteria and their interactions, whereby it is achieved that the result of the process is very close to the end design of the structure.

A relevant feature of the present invention is that the mentioned interactions can lead and in fact do lead to non-linear evolutions and potential discontinuities of the safety margin and therefore to a greater complexity of the optimizing process.

Other features and advantages of the present invention will be disclosed in the following detailed description of an illustrative embodiment of its object in relation to the attached figures.

DETAILED DESCRIPTION OF THE INVENTION

The approach to a structural optimization problem basically consists of the search for a minimum of a target function. In the case at hand, the target function is the minimum structural weight, subject to a series of conditions that must be fulfilled simultaneously, such as positive safety margins, specific design criteria, manufacturing restrictions, and stiffness restrictions to prevent aeroelastic phenomena, etc.

As is well known, an optimization problem of the type being considered can be formulated by means of the expression min $f(x_i)$ in which f is the target function, (in this case, it will preferably be the minimum weight) $x_i$ are the variables of the problem and $g_j(x_i)$ are the restrictions.

When the material of the structural element object of the optimization is isotropic, the number of variables involved in the problem is considerably smaller than in the case of using composite materials. Some reasons that could be put forward are: the rigidity depends on the orientation and the stacking of the fibers, the thicknesses are discrete and non-continuous variables, etc.

The enormous degree of complexity indicated suggests developing a process attempting to reduce the complexity of the problem to reasonable parameters allowing the achievement of the target in a safe but also fast and effective manner.

An embodiment of the present invention for obtaining an optimized design of a reinforced skin of a torsion box of an aeronautical structure will be described below, describing said skin in the first place.

Figure 1A:
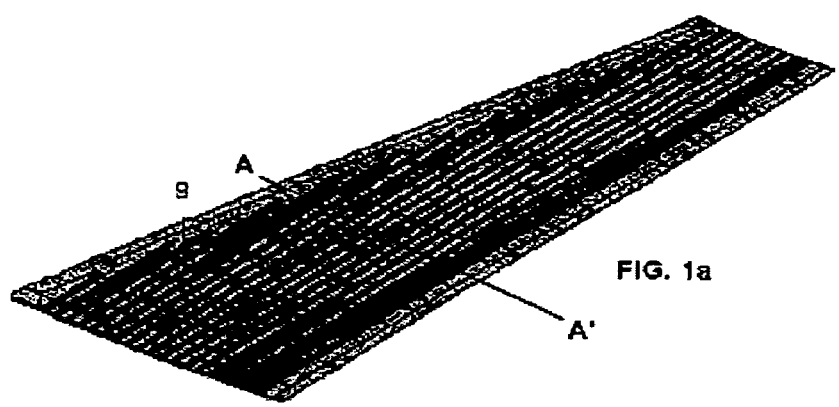
FIG. 1a is a perspective view of a skin of a torsion box that can be designed by following the process object of the present invention.
Figure 1B:
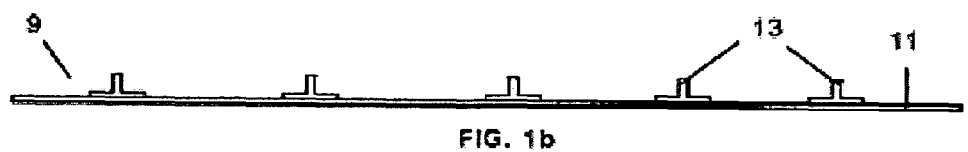
FIG. 1b is a cross-section view of FIG. 2a by axis A-A'.

The primary function of the skin 9 of the torsion box of an aeronautical structure like the one represented in FIG. 1 belonging to a lifting element, wing or stabilizer of an aircraft is to form a continuous surface supporting and distributing the aerodynamic pressure induced by lifting the element. These aerodynamic forces act normally to the skin.

On the other hand, before said external loads, the wing or stabilizer behaves like a cantilever beam, giving rise to an internal distribution of the shear forces, bending and torsional moments along the span. While the axial and bending loads are supported by the combined action of the panels and stringers of the skin, the shear forces and torsional moments acting on the wing are supported by the panels of the skin and the webs of the stringers. In other words, the skins are subjected to the combined action of:

Axial loads, basically coming from the bending of the box creating tension in one skin and compression in the opposite one.

Shearing loads coming from the torsional moment and the shear force.

Transverse loads, which can come from several sources:
The tapering of the torsion box.
Poisson effects.
Local load inputs coming from the fastening ironwork of other elements such as rudders, flaps, etc.

The structural configuration of skin 9 that is most used to support the mentioned combination of loads consists of a panel 11, with a very reduced curvature forced by the aerodynamic profile, supported in the ribs and stringers with a certain degree of rotation restriction and longitudinally stiffened by means of stringers 13.

The panel 11 is built by means of stacking carbon fiber layers pre-impregnated in resin. The layers are very thin, (thicknesses less than 0.25 mm), and are formed by carbon filaments all of which are oriented in a same direction (tape), or in two directions (fabric), and embedded in uncured resin. Each layer is oriented in the predefined direction, typically fixing 4 stacking directions: 0°, 90°, +45° and −45°, although said rule is not fixed. On the other hand, the amount of layers in each direction will be fixed by the mechanical properties required by the designer. Once the resin curing process has been carried out, in high temperature and pressure conditions, the panel acquires its definitive features.

On the other hand, the manufacture of the stringer 13 is carried out in the same manner. The joint between both elements can be carried out curing both elements jointly or using an intermediate adhesive. In any of the two cases, for analytical purposes and given the high quality of the obtained joint, it can be considered that both elements work jointly.

Figure 4:
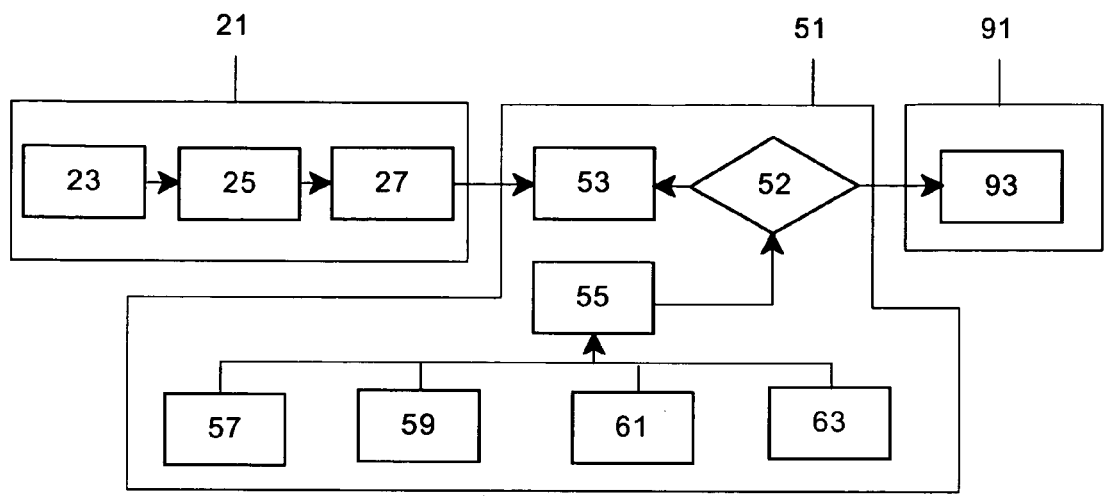
FIG. 4 shows a diagram of the process for optimizing the design of a skin of a torsion box of an aeronautical structure according to the present invention.

The process for optimizing the structural design of said part according to the present invention will be described in detail below and comprises (see FIG. 4) three great phases:
Preparation phase 21.
Simulation phase 51.
Result presentation phase 91.

The preparation phase 21 comprises in turn two steps:
Obtaining a Simulation Model (SM) 25 of the skin 9 from a general finite element model (GFEM) 23.
Defining the variables and restrictions 25.

The starting point of the preparation phase 21 will be a GFEM 23 of the torsion box and external loads applied therein. In other words, the topology of the problem will be an initial datum, topology being understood as the geometric location of the different elements forming the box:

Location of the stringers.
Location of the ribs, which will allow defining the length of the panels.
Stringer pitch, which can obviously be constant or variable.
Orientation thereof, understanding as such if they are parallel to one another or to any stringer.

The previous data will not be the object of the optimization, i.e., they will remain constant during the entire process. If the influence of the modification of any of them on the weight of the structure is to be evaluated, it would be necessary to carry out said modification on the GFEM 23 itself and restart the process. Obviously, it would be ideal to consider said data as variables of the problem, but said hypothesis would convert the problem into something unmanageable. Nevertheless, the process according to the present invention achieves that the complete process is very fast, thus allowing carrying out multiple studies with a very low computation cost, even simultaneously, facilitating the comparison of results and the selection of the optimal overall solution.

Although the object of the optimization will only be the skin 9, the GFEM 23 can include all the elements of the torsion box. In other words, any transformation of the original model used will not be necessary to obtain internal loads of the structure.

The skin 9 can be continuous or have openings. The only essential requirement will be the separate idealization of stiffeners and skin panels, as well as the correct delimiting thereof by means of the idealization of stringers and ribs.

It is not necessary for the GFEM 23 of the skin 9 to include properties of the elements, thicknesses, materials, areas, etc. However, it is essential to define the 0° orientation of the material, i.e., the axis on which the stacking orientation of the composite material layers will be defined.

On the other hand, it is also necessary to include in the GFEM 23 of the skin 9 the definition of the finite elements that will form part of each structural element as well as the identification thereof according to an established guideline.

The second step of the preparation phase 21 is obtaining the SM 25 of the skin 9 which is based on the structural element concept.

Figure 2:
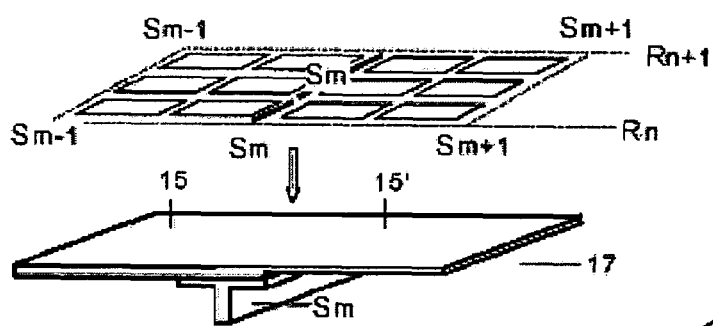
FIG. 2 shows a structural element of the skin of the torsion box of an aeronautical structure and its idealized representation in a finite element model.

The structural element 17 is defined as the smallest part of the skin 9 working jointly which, as shown in FIG. 2, is formed by a section of stringer $S_m$, limited by the ribs $R_n$ and $R_{n+1}$ and its two adjoining panels 15, 15' (reaching from stringer $S_m$ to the adjacent stringer $S_{m+1}$ or $S_{m-1}$), which can be idealized by one or several finite elements (FIG. 2 shows three elements for each panel 15, 15').

Figure 3:
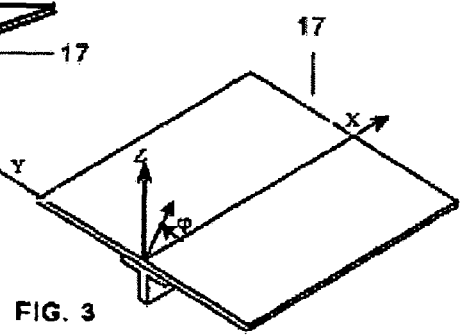
FIG. 3 shows a structural element of the skin of the torsion box of an aeronautical structure with a local axes system.

SM 25 contains, for each structural element 17, all the relevant information for the structural analysis process mentioned below:

Geometry:
Width and length of the panels 15, 15'.
Axis $\phi$ of the stacking orientation of the material against local axes (X, Y, Z) of the structural element 17 (see FIG. 3).
Shape of the straight section of the stringer Sm.
Dimensions of the stringer Sm.

Figure 5:
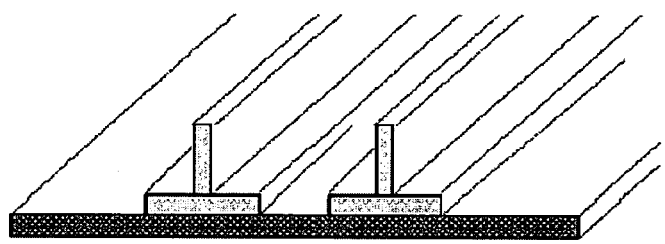
FIG. 5 shows a simplified example of said skin.

Table 1 shows some starting geometric data of the skin example shown in FIG. 5 consisting of three panels and two T-shaped stringers.

TABLE 1

|  | Starting dimensions |
| --- | --- |
| Stringer root width (mm) | 70 |
| Stringer root thickness (mm) | 4 |
| Stringer web height (mm) | 65 |
| Stringer web thickness (mm) | 3 |
| Panel thickness (mm) | 8 |

Mechanical properties:
  Stacking of panels 15, 15'.
  Stacking of stringers Sm along their entire straight section.
  Properties of the material forming the stacking.
Mechanical properties of the layer.
Table 2 shows some data of the starting stacking of the panels of the skin example shown in FIG. 5.

TABLE 2

|  | Starting dimensions |
| --- | --- |
| Percentage of layers at 0° | 55 |
| Percentage of layers at 45° | 35 |
| Percentage of layers at 90° | 10 |

Loads in panels 15, 15' and stringer Sm.
Safety margins for all the failure modes applied to the structural element 17.
For example, in relation to the skin example shown in FIG. 5, safety margins exceeding 1.0 are established for the following failure modes:
  Local stringer buckling.
  Local skin buckling.
  Buckling of the skin between rivets.
  Post-buckling in the event of local instabilities of the stringer and the skin.
  General structure buckling.
  Tolerance to damage in the skin, root and web of the stringer.
  Potential riveted joints in the skin and root and web of the stringer intended to assure the repair capacity of the component.

The third step of the preparation phase 21 is the definition of the design variables and the restrictions 27.

The definition of a design variable means identifying a previously defined feature in the "structural element" 17, which will be subjected to the analysis of sensitivity which the latter has on the result of the structural analysis.

For example, if the thickness of the panel is defined as a design variable, the optimization motor will compute the variation of the safety margin of each associated failure criterion before a unit variation of the value of the variable. This will allow directing the process towards the structural variants with minimum weight in relation to the established variable.

The number of design variables that can be defined in a structural element essentially depends on the geometric complexity thereof and can be very high. Therefore, the process will allow the user to select the design variables which will be optimized. To carry out this selection correctly, those variables having greater influence in the target function must be considered, such as:
  Thicknesses of the panels.
  Thicknesses of the different stringer segments.
  Dimensions of the stringers.
  Percentages of the possible orientations of panel layers.
  Percentages of the possible orientations of layers of the different stringer segments.

In spite of the foregoing, the number of design variables subject to optimization does not represent a limitation to the described process, but rather said limitation is imposed by the abilities of the computation equipment and the mathematical optimization algorithms.

In relation to the skin example shown in FIG. 5, the following are considered as design variables:
  Stringer root width.
  Stringer root thickness.
  Stringer web height.
  Stringer web thickness.
  Panel thickness.
  Percentage of layers at 0°.
  Percentage of layers as 90°.

In terms of the restrictions, they are defined as a variability range or dimension of a parameter, which may or may not be a design variable. For example, the thickness of the panel may be defined as a design variable and at the same time define a minimum and/or maximum value thereof as a restriction.

However, a minimum value for the stringer area-panel area ratio, which does not necessarily have to be a design variable, could be defined as a restriction.

Another type of restriction that must be defined is the maximum ratio of the values of design variables corresponding to contiguous elements, such that it complies with the design rules ensuring that the component can be manufactured.

In summary, if a parameter is defined as a design variable, it will mean that it will be object of the sensitivity analysis with respect to the safety margins, whereas if it is defined as a restriction, it will only verify the compliance thereof by means of the optimal solution.

Manufacturing restrictions applied to the case of the skin shown in FIG. 5 are mentioned below:
  Effective width of the panel. Ratio of the stringer pitch and width of the root thereof.
  Ratio of longitudinal and shear stiffness of the panel $E_x/G_{xy}$.
  Rivet diameter used in the repair capacity criterion.
  Minimum thickness of the panel.
  Thickness and length of the stringer root.
  Thickness and length of the stringer web.
  Ratio between stringer web thickness and root thickness.
  Ratio between stringer web thickness and web height.
  Ratio between stringer root thickness and panel thickness.
  Percentage of layers in the panel in direction 0°.
  Percentage of layers in the panel in direction 90°.

There must be an automatic data transmission between the SM 25 and GFEM 23 so as to evaluate the effect which the modifications generated during the optimization process described below have on the internal load distributions. It is necessary to take into account that insofar as in this process the modification of the value of the optimization variables is aimed at variants of the minimum weight, which may generate relative stiffness variations between the structural elements forming the skin and therefore modifications in the load paths thereof.

After describing the preparation phase 21 of the process of optimizing the structural design of the skin 9 according to the present invention, the simulation phase 51 will now be described, which comprises applying the SM 25 of an optimization motor 53 in an iterative loop 52, which uses simulation modules 55 of families of failure modes relating to stability 57, damage tolerance 59, repair capacity 61 or other causes 63, modifying in each step of the loop 52 the values of the design variable selected for the purpose of minimizing the weight of the skin 9.

The skin 9 subjected to the mentioned loads may collapse in several typical manners:

Instability

Rupture, considering the presence of allowable manufacturing damages and defects.

Joints between different elements: ribs, spars, fittings, etc.

On the other hand, taking into account the service life of the component the repair capacity thereof must be assured. This factor will be taken into account by means of the predefinition of repairs such as riveted patches.

Each of said failure modes must be considered during the sensitivity analysis which the optimization motor 53 must carry out. This makes the creation of simulation expert modules 55 which efficiently cover the analysis essential, such efficiency being understood from three points of view: safety of the simulation, robustness thereof and reduced cost in terms of computational consumption.

The concept of simulation expert module 55 is limited by the following parameters:

It does not apply simple and common formulas of the literature specialized in determining pure failure loads of simplified elements, but rather uses complex processes of determining said allowable loads taken into account:

Any combination in the load plan in the two most shear directions.

Effects of the root of the stringer on local and general instabilities.

Different stackings consisting of different materials both in panels and stiffeners.

Especially, however, the expert module is characterized by its capacity to take into account the interaction between the different failure modes it considers, such that it can determine not only the primary or pure failure modes but also the effect that one of them may have on the others according to the load level presented to each of them. An example to explain this interaction is considered below:

Local buckling occurs in the panel located between two stringers at load level P, the load causing the greater general buckling.

Under these conditions when the stringer has enough inertia to prevent general buckling, the stiffened panel develops post-buckling, causing a redistribution of loads on the stringer.

Finally, the assembly will collapse either because of the failure, such as the stringer column, or because of the separation of the panel-stringer interface at a load P+ΔP.

Up to the preceding point, the first point related to the use of complex processes would be applicable. However, the expert module takes an extra step by relating the previous sequence with the effects the secondary load distribution generated by the instability may cause on the other general failure criteria, such as damage tolerance or repair capacity. In other words, the safety margins of these two criteria will take into account the loads caused by the redistribution, not the initially applied loads, if such redistribution finally takes place.

In a preferred embodiment of the present invention, each of the failure modes has a simulation expert module 55 associated thereto. This provides the process with great flexibility due to the following reasons:

The simulation expert modules 55 can be related or unrelated to the optimization, allowing the study of the affect which the consideration of each failure criterion has on the weight of the optimal structure.

The corrections or improvements of the simulation expert modules 55 can be done in a manner that is completely independent from the performance of the process of optimizing the design of a certain component.

New simulation expert modules 55 can very easily be incorporated to the process of optimizing the design of the component.

In a preferred embodiment, the simulation phase 51 is carried out in the following steps:

a) The model is run with starting data for the purpose of having a correct distribution of internal loads between the different structural elements 17 of the skin 9 according to their relative stiffness.

b) Then the optimization motor 53 will obtain for each structural element 17 the safety margins corresponding to the different simulation expert modules 55.

c) Once the safety margins for each of the associated failure modes are obtained, the optimization motor 53 will carry out the sensitivity analysis for each of them.

d) Taking into account the results obtained in the previous analysis and the remaining restrictions defined, the design variables considered to be the most promising for decreasing the weight of the skin 9 are modified.

e) Taking into account the potential modification of the relative stiffnesses which said changes will produce, a new distribution of internal loads in the different elements 17 of the skin 9 must be obtained, modifying the model and running it again.

f) With the changes made the entire process will be repeated from step b) so that the optimization motor 53 may progressively reduce the initial weight in consecutive iterations, converging into one solution from which any introduced modification does not allow further reductions, complying with the initial restrictions.

g) The final step final consists of completely defining the skin stacking sequence from the optimal percentages of layers for each of the orientations considered.

The last phase 91 of the process of optimizing the structural design of the skin 9 according to the present invention is the phase of presenting the results of the optimal solution 93.

These results, which may be presented graphically or numerically, typically comprise the following information:

The optimal value obtained for each of the optimization variables.

The safety margins associated to each and every one of the failure modes comprised in the process of optimization and their corresponding load case.

The critical safety margins.

Critical load cases.

The failure modes associated to the critical safety margins.

The initial and end result of the objective function as well as its evolution throughout the consecutive iterations.

Figure 7:
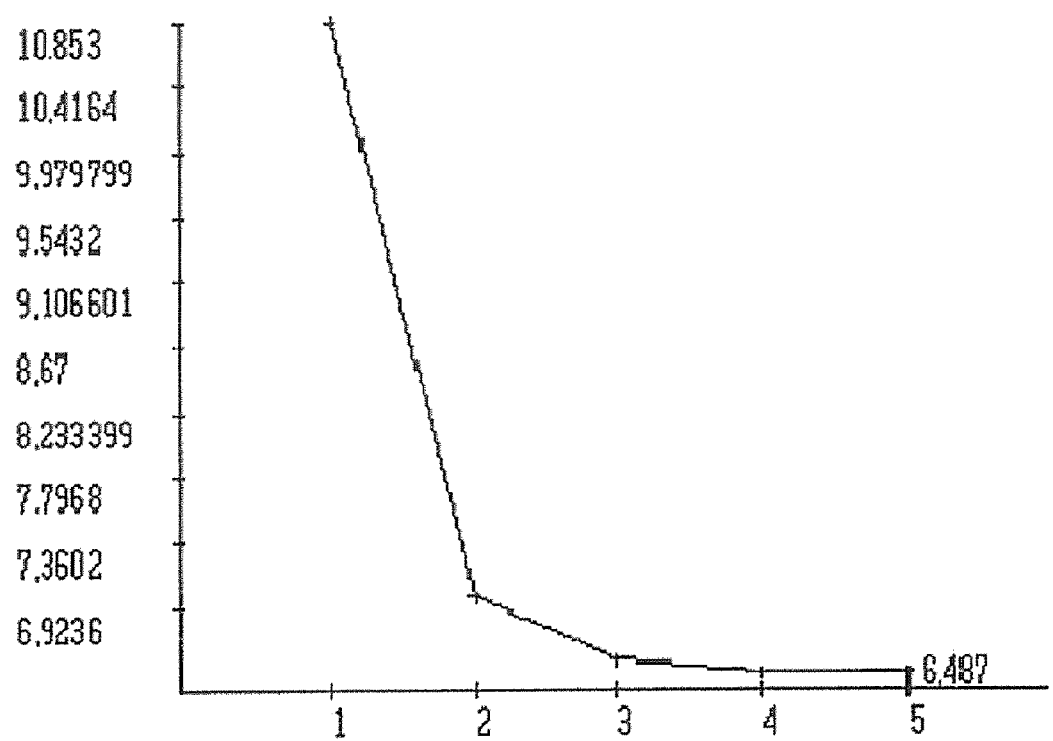
FIG. 7 shows the variation of the weight of the skin in a simulation phase in which the optimal solution is reached in six iterations.

In relation to the example of the skin shown in FIG. 5, FIG. 7 shows the variation of the weight of the skin in a simulation phase 52 in which the optimal solution is reached in six iterations.

Table 3 in turn shows the evolution of the optimization variables used.

TABLE 3

|  | Starting dimensions | Optimized dimensions |
|---|---|---|
| Stringer root width (mm) | 70 | 76 |
| Stringer root thickness (mm) | 4 | 2.4 |
| Stringer web height (mm) | 65 | 51 |
| Stringer web thickness (mm) | 3 | 1.7 |
| Panel thickness (mm) | 8 | 3 |
| Percentage of layers at 0° | 55 | 40 |
| Percentage of layers at 90° | 10 | 20 |

As can be deduced from the preceding data, the process of optimization is fixed for the extension of the stringer root, reducing its thickness, for a reduction both of the stiffener web height and thickness, thus decreasing its inertia, and for a reduction of the panel thickness and for a less directional laminate. These changes translate into a 40% weight reduction.

The process of optimizing all the structural elements susceptible to being defined in a complete skin can be extremely expensive and complex, but furthermore taking into account the restrictions imposed by the manufacturing process, it may give rise to optimal but unfeasible solutions. To that en, in a preferred embodiment of the present invention, the SM 25 is not implemented at the level of the structural element 17 but rather at the regional level, this being understood as a group of structural elements 17 having one or more common design parameters, both restrictions and optimization variables being understood as such.

Figure 6:
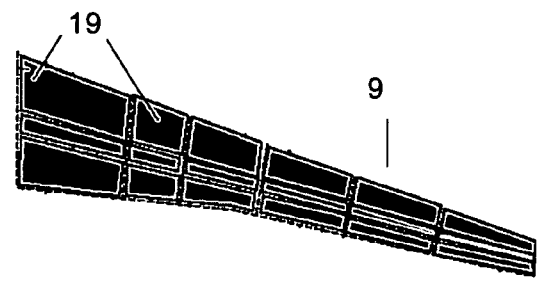
FIG. 6 shows a skin of a torsion box of an aeronautical structure subdivided into optimization regions.

FIG. 6 shows a subdivision in regions of 19 of the skin 9.

The present invention is applicable to the design of aircraft components such as horizontal and vertical stabilizers, outer and inner wings, including high-lift surfaces such as elevators and rudders, flaps, slats, comprising within their architecture elements formed by stiffening panels with a small curvature.

Apart from its use for the design of skins, the process according to the present invention can be used for:
- Identifying the factors having the greatest influence on the design and their impact on the final target function, such as:
  - Critical failure modes
  - Critical load cases.
- Viability studies such as:
  - Influence of the variation of mechanical properties of the materials.
  - Influence of the orientation of the rosette defining the angles of the layers.
  - Influence of the general flexibility of the component on its aerodynamic behavior. The deformation of the component modifies the shape thereof and accordingly the aerodynamic loads it will be subjected to. Therefore the general stiffness could be incorporated as a design restriction.

Any modifications comprised within the scope defined by the following claims can be introduced in the preferred embodiment described above.

The invention claimed is:

1. A computer-aided process for carrying out the structural design of a stiffened panel (9) made of a composite material, optimizing a target variable, characterized in that it comprises the following steps:
   a) Obtaining a Simulation Model (25) of the stiffened panel (9) including all the relevant information for the structural analysis thereof from a General Finite Element Model (23);
   b) Providing the definition of at least one modifiable design variable of the stiffened panel (9);
   c) Providing the definition of at least one restrictive condition that the design of the stiffened panel (9) must meet;
   d) Providing at least one simulation expert module (55) of a family of failure modes of the stiffened panel (9), wherein said at least one simulation expert module (55) of a family of failure modes of the stiffened panel (9) takes into account the interactions existing between the different failure modes of the family;
   e) Iteratively modifying the design variables of the Simulation Model (25) of the stiffened panel (9) for the purpose of optimizing the target variable, taking into account in each iteration the load distribution changes resulting from the previous iteration, and verifying that said at least one restrictive condition as well as the safety margin associated to the pre-established failure modes are met by using said at least one simulation expert module (55).

2. A computer-aided process for carrying out the structural design of a stiffened panel (9) made of a composite material according to claim 1, characterized in that said stiffened panel (9) is a skin of a torsion box of an aircraft.

3. A computer-aided process for carrying out the structural design of a stiffened panel (9) made of a composite material according to claim 1, characterized in that said stiffened panel (9) is a skin of a torsion box of an aircraft.

4. A computer-aided process for carrying out the structural design of a stiffened panel (9) made of a composite material according to claim 3, characterized in that said stiffened panel (9) is a skin of a torsion box of an aircraft.

5. A computer-aided process for carrying out the structural design of a stiffened panel (9) made of a composite material according to claim 1, characterized in that the target variable is the weight of the stiffened panel (9).

6. A computer-aided process for carrying out the structural design of a stiffened panel (9) made of a composite material according to claim 5, characterized in that said stiffened panel (9) is a skin of a torsion box of an aircraft.

7. A computer-aided process for carrying out the structural design of a stiffened panel (9) made of a composite material according to claim 5, characterized in that said stiffened panel (9) is a skin of a torsion box of an aircraft.

8. A computer-aided process for carrying out the structural design of a stiffened panel (9) made of a composite material according to claim 5, characterized in that several simulation expert modules (55) of families of failure modes of the stiffened panel are provided, and in that the interactions existing between the failure modes of the various simulation expert modules (55) are taken into account in the verification of compliance with the safety margins associated to the pre-established failure modes using said expert modules.

9. A computer-aided process for carrying out the structural design of a stiffened panel (9) made of a composite material according to claim 8, characterized in that the families of failure modes object of said simulation expert modules (55) include one or more of the following: instability, damage tolerance and repair capacity.

10. A computer-aided process for carrying out the structural design of a stiffened panel (9) made of a composite material according to claim 8, characterized in that said stiffened panel (9) is a skin of a torsion box of an aircraft.

11. A computer-aided process for carrying out the structural design of a stiffened panel (9) made of a composite material according to claim 1, characterized in that several simulation expert modules (55) of families of failure modes of the stiffened panel are provided, and in that the interactions existing between the failure modes of the various simulation expert modules (55) are taken into account in the verification of compliance with the safety margins associated to the pre-established failure modes using said expert modules.

12. A computer-aided process for carrying out the structural design of a stiffened panel (9) made of a composite material according to claim 11, characterized in that said stiffened panel (9) is a skin of a torsion box of an aircraft.

13. A computer-aided process for carrying out the structural design of a stiffened panel (9) made of a composite material according to claim 11, characterized in that the families of failure modes object of said simulation expert modules (55) include one or more of the following: instability, damage tolerance and repair capacity.

14. A computer-aided process for carrying out the structural design of a stiffened panel (9) made of a composite material according to claim 13, characterized in that said stiffened panel (9) is a skin of a torsion box of an aircraft.

* * * * *